United States Patent [19]

Baus

[11] Patent Number: 4,913,578
[45] Date of Patent: Apr. 3, 1990

[54] CONNECTION ARRANGEMENT

[75] Inventor: Heinz G. Baus, Hünibach-Thun, Switzerland

[73] Assignee: Altura Leiden Holding B.V., Maastricht, Netherlands

[21] Appl. No.: 298,698

[22] Filed: Jan. 19, 1989

[30] Foreign Application Priority Data

Jan. 22, 1988 [DE] Fed. Rep. of Germany ....... 3801772

[51] Int. Cl.⁴ .......................... B25G 3/34; F16B 11/00
[52] U.S. Cl. ...................................... 403/270; 403/23; 403/102; 403/296; 403/404; 403/271; 228/140; 228/142; 228/160; 219/98
[58] Field of Search ............... 403/270, 271, 272, 296, 403/404, 101, 102, 329, 23; 228/140, 142, 160; 219/97, 98; 29/525, DIG. 48

[56] References Cited

U.S. PATENT DOCUMENTS

| 2,447,085 | 8/1948 | Odlum | 403/270 |
| 3,202,245 | 8/1965 | Letarte | 403/401 |
| 4,090,799 | 5/1978 | Crotti et al. | 403/401 |
| 4,103,371 | 3/1977 | Nagase | 403/187 |
| 4,160,148 | 7/1979 | Jenkins | 219/98 |
| 4,380,110 | 3/1983 | Harig | 403/270 X |
| 4,527,364 | 7/1985 | Baus | |
| 4,653,127 | 3/1987 | Baus | |

FOREIGN PATENT DOCUMENTS

| 1988819 | 7/1968 | Fed. Rep. of Germany. |
| 7427039 | 12/1974 | Fed. Rep. of Germany. |
| 2287608 | 5/1976 | France. |

Primary Examiner—Andrew V. Kundrat
Assistant Examiner—Franco Deliguori
Attorney, Agent, or Firm—Foley & Lardner, Schwartz, Jeffery, Schwaab, Mack, Blumenthal & Evans

[57] ABSTRACT

A connection arrangement with profiled parts contains, in at least one hollow chamber in a profiled part, a connecting element by means of which a connection with the other profile part is effected. The purpose of the invention is to provide, at low manufacturing cost, a reliable connection and to eliminate any after-treatment of surfaces in the vicinity of the connection. It is proposed that the connecting element be secured to the web of the first profiled part and that a length thereof projects, prior to welding, beyond the front surface; and that, after welding, the weld-zone be arranged in the hollow-chamber in the second profiled part and be at a distance from the adjacent front surfaces of the profiled parts.

19 Claims, 2 Drawing Sheets

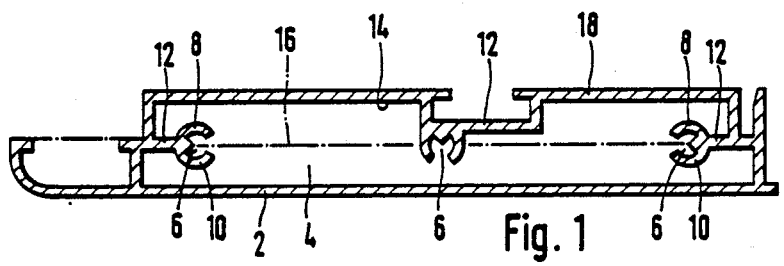
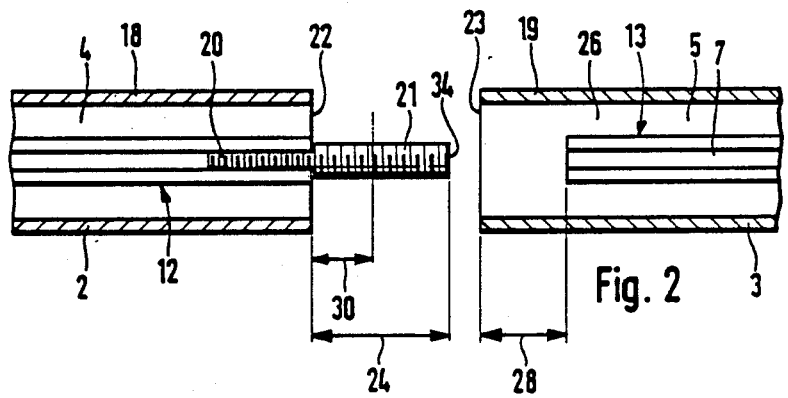
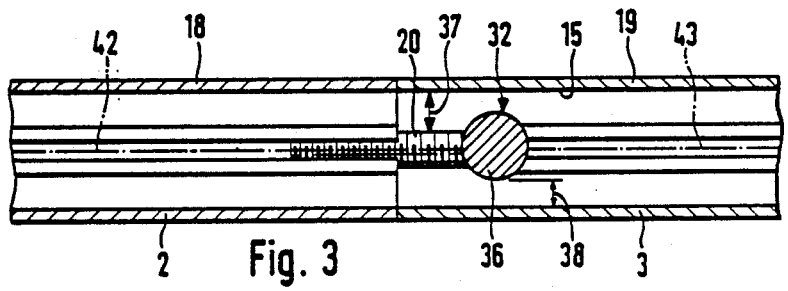

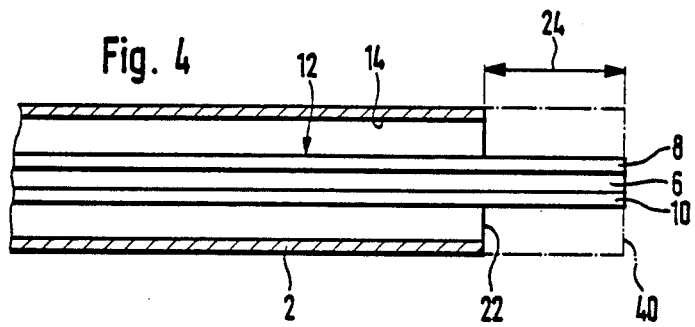
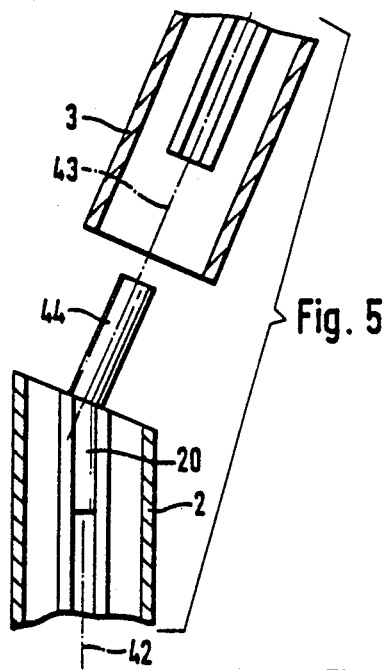
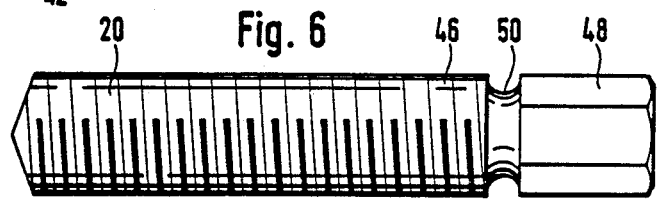

CONNECTION ARRANGEMENT

BACKGROUND OF THE INVENTION

1. Field of the invention

The present invention relates to a connection arrangement of profiled parts, more particularly of the frame of a cupboard or of a partition for a shower-stall or bathroom, containing at least one web arranged in a first hollow chamber in a first profiled part and, a connecting element by means of which a second profiled part and the web are connected.

2. Description of the Prior Art

Disclosed in U.S. Pat. No. 4,653,127 is an arrangement of two profiled parts which are in the form of hollow-chamber profiled rails comprising, in the interior of the hollow chamber, at least one web with a screw-channel. In order to join the two profiled rails together at right angles to each other, the one profiled rail comprises a passage, at right angles to the longitudinal direction, for the connecting element which is in the form of a screw and engages in the screw-channel in the other profiled rail. Also associated with the screw-channel is a plastic corner-connector which serves, among other things, to cover the cut edges of the profiled rails to be joined. As a result of production tolerances, gaps may occur in the connecting area between the profiled rails and these can be concealed with a corner-connector of this kind. The cost of production and assembly is high.

Known from U.S. Pat. No. 4,527,364 is a connection arrangement, in the form of a corner-connector, for two profiled rails. The legs of the corner-connector engage in the hollow chambers of the profiled rails to be joined. One of the profiled rails furthermore comprises a web which engages in a passage in the other profiled rail and is united with the corner-connector by means of a screw. This connection arrangement provides satisfactory stability and resistance to distortion, but production costs are high.

Disclosed in German Utility Model 74 27 039 is a connection arrangement for two profiled rails which are joined together at right angles. The front surfaces of the profiled parts are at an angle of 45° to the respective longitudinal axes. According to a first example of embodiment, the connection is effected by means of a plug-in element which is a press-fit in channels in the interior of the profiled parts. The load-carrying capacity of a connection of this kind is not very great and, if the plug-in element becomes loose, there is a danger that the connection arrangement will no longer meet the requirements. According to another example of embodiment, the connection is effected by means of a screw which passes through a passage in the outside of a profiled rail and is screwed into the screw-channel in the other profiled part. In practice, a threaded connection of this kind must be carried out manually and it requires time and personnel. Furthermore, the head of the screw is visible on the outside of the one profiled part and this detracts from the appearance of a connection arrangement of this kind.

German Utility Model 19 88 819 discloses a set of components in which the profiled parts are connected together by flash butt-welding. Before they are joined, the profiled parts exhibit projections extending from their front surfaces. These projections are arranged at the front surfaces in such a manner that weld-beads arise there while the joint is being produced by flash butt-welding. The weld-seams are arranged in areas which, after welding, are easily accessible from the outside, so that weld-beads and splatters can be removed in a subsequent operation. This after-treatment of the weld-areas leads to additional labour and production costs. Furthermore, it is scarcely possible, in practice, to avoid the occurrence of weld-pits which arise during flash butt-welding. After a weld-bead has been ground away, these pits remain visible on the outside of the connection and may have to be filled with putty, varnish, or the like.

OBJECTS OF THE INVENTION

It is therefore the purpose of the invention to propose a connection arrangement which ensures reliable joints between profiled parts and which can be made quickly and/or at little cost. During production of the connection, the shape and/or surface properties of the profiled parts are to remain largely unaffected and after-treatment in the joint-area is to be eliminated. After the connection has been made, the profiled parts are to retain the desired geometrical alignment accurately. Gaps between the profiled rails are to be avoided in the joint area, as are accumulations of material due to deformation or the like.

SUMMARY OF THE INVENTION

According to the present invention, there is provided a connection arrangement of profiled parts, comprising at least one web arranged in a first hollow chamber in a first profiled part, and a connecting element by means of which a second profiled part and the web are connected, wherein:

the connecting element is connected to the web of the first profiled part and is at a distance from a front surface of the first profiled part, a second hollow chamber in the second profiled part is provided with a further web, the connecting element being connected in the second hollow chamber by a weld-zone to the further web, the weld-zone is arranged in the second hollow chamber of the second profiled part at a predetermined distance from adjacent front surfaces of the two profiled parts.

The proposed connection arangement ensures reliable joints between the profiled parts, the front surfaces of which lie firmly and/or closely together without a weld-seam. The connection arrangement may be produced rapidly and at low cost and after-treatment of the visible external surfaces, or of the outer walls of the profiled parts, is unnecessary. The weld-seam produced by butt- or flash-welding is located inside the hollow chamber and is not visible from the outside.

Preferably the connecting element, in the form of a bolt, is screwed into a screw-channel in the web of the first profiled part, the bolt extending beyond the front surface of the first profiled part.

The bolt may be connected to the first profiled part in some other manner, for example by pressing-in or welding, and it may be cross-sectionally circular, rectangular or of some other shape. Moreover, one end of the first profiled part may be shortened, so as to leave only the web standing and to form the projecting connecting element.

The weld-zone is spaced from the front surfaces of the outer walls so that, during welding, plastic material from the weld-zone cannot reach the front surfaces and thus prevent the front surfaces of the two profiled parts from lying properly together. Furthermore, the weld-zone is preferably spaced from the outer walls of the profiled parts. This ensures that, during welding, the outer walls of the second profiled part are not unduly heated, or even deformed, by the hot, molten material of the connecting element and of the web of the second profiled part. The size of the weld-area, and the distance between it and the internal surfaces of the outer walls, are matched, thus preventing undue heating of the outer walls of the profiled parts during welding.

The profiled parts to be joined together are suitably aligned in the next step of the method and are connected to the electrodes of an electrical welding unit which will not be explained here. The two profiled parts are then pushed together and the flowing welding current melts or softens the material of the web and/or of the bolt, the welded joint obtained being in the form of a butt-weld, more particularly a flash butt-weld. For this step of the method it is esssential that the two profiled parts be pressed together during welding and that an accumulation of molten material shall occur in the joint-area of the webs. Since the web or the bolt is arranged in the interior of the hollow chambers in the profiled parts, the external surfaces of the parts are in no way impaired during welding and no after-treatment is needed after the welded joint has been produced.

In addition to this, it is also essential to the method that the welding current be shut off before the front surfaces of the profiled parts have reached a predetermined distance from each other. This prevents arcing between the front surfaces of the outer walls which might also result in the outer walls being welded. After the welding current has been shut off, the profiled parts continue to move towards each other, until they lie at least approximately together. In any case, after the weld-zone has cooled, shrinkage occurs, causing the front surfaces to come together. The welding current is cut off specifically when the front surfaces of the two approaching profiled parts are at a predetermined distance apart. This ensures, on the one hand, that the front surfaces bear firmly and/or closely together and, on the other hand, that there will be no excessive deformation in the connection area.

According to one practical configuration, the web of the second profiled part is shortened, from the front surface, by a specific amount; the web end being at a corresponding distance from the front surface of the second profiled part. The length by which the connecting element projects beyond the front surface of the first profiled rail is deliberately made greater than the depth at which the web of the second profiled part ends before the front surface thereof. When the connecting element is welded to the web of the second profiled part, both the end of the connecting element, and the end of the web of the second profiled part, melts, the weld-zone being formed by the material which has thus become plastic and fluid. At the conclusion of the welding operation, the weld-zone, i.e. the central plane of the weld-zone, is at a distance from the front surfaces, the distance being shorter than the length of the connecting element. In the case of a connection arrangement of this kind, the weld-zone and the connecting area are at a distance from the closely adjacent front surfaces of the outer walls of the two profiled parts, within the second profiled part. This ensures that, when the material, which is becoming plastic and/or fluid, is being welded, it cannot reach the front-surface area and prevent an orderly connection.

The proposed connection-arrangement may be used for profiled parts having their longitudinal axes running in the same direction and for profiled parts whose longitudinal axes are at a predetermined angle, for example 90° or less, to each other. The profiled parts may be individual rails cut to length which are assembled to form a frame, for example the frame of a mirrored cupboard or of a shower partition. This makes it possible to produce a frame without additional corner-connectors, screws, or the like, at extremely low production and assembly costs.

BRIEF DESCRIPTION OF THE DRAWINGS

The invention will be described hereinafter in greater detail, in conjunction with preferred embodiments illustrated in the drawings, wherein:

FIG. 1 is a cross-section through a profiled part at right angles longitudinal axis thereof;

FIG. 2 is a cross-section through two profiled parts prior to welding;

FIG. 3 is a cross-section through the finished connection-arrangement;

FIG. 4 is a cross-section through an alternative to FIG. 2;

FIG. 5 is a diagrammatical representation of another example of embodiment;

FIG. 6 shows, to an enlarged scale, a bolt before it has been screwed into one of the screw-channels in a profiled part.

DESCRIPTION OF AN EXEMPLARY EMBODIMENT

FIG. 1 shows a cross-section at right angles to the longitudinal axis of a profiled part 2 which is in the form of a hollow-chamber profiled rail. The profiled part 2 contains a hollow chamber 4 in which three enlarged connecting areas or screw-channels 6 are located. These channels are of usual design, each containing two legs 8,10 between which a screw or bolt having an external thread may be screwed in the usual manner. The channels 6 are, respectively, parts of webs 12 which are spaced from inner wall 14 of the outer wall 18 of the profiled part 2. The profiled part 2 has a flat, substantially rectangular cross-section and all three channels 6 are arranged in a central plane 16. During manufacture of the profiled part, the webs 12 with the channels 6 are produced simultaneously therewith, in one piece, by extrusion or injection-moulding. The webs 12, with the channels 6, extend, as does the profiled part 2 as a whole, at right angles to the plane of the drawing. As compared with the remainder of web 12, the legs 8,10 have an enlarged cross-sectional area. The outer walls 18 of the profiled parts 2 completely enclose the hollow chamber 4, and the profiled part 2 may therefore be regarded as a closed hollow-chamber profile. The invention also covers profiled parts which walls are not completely closed peripherally, whereas a hollow chamber having at least one web is also present.

FIG. 2 shows a cross-section through two profiled parts parallel with their longitudinal axis before the connection has been made. The figure shows profiled parts 2 and 3 which are to be joined together. Screwed into screw-channel 6 of the profiled part 2 is a connecting element 20 which is in the form of a bolt carrying a thread 21 on its outer surface. The cross-sectional area of the bolt is larger than that of web 12. The resulting connecting element will hereinafter be referred to as bolt 20 for the sake of simplicity. Front surfaces 22,23 of the outer walls 18, 19, surrounding the hollow chambers 4,5, of profiled parts 2,3, face each other. Bolt 20 projects outwardly beyond front surface 22 by length 24. In the profiled part 3, the web 13, with the screw-channel 7 in the interior of the hollow chamber 5, has been shortened, so that the end 26 of the web 13 is displaced by a depth 28. The length 24 is greater than the depth 28 by a predetermined length 30.

In an alternative configuration, shortening of the web or screw-channel of the second profiled part may be omitted. In this case, the bolt 20 may be shorter so that it projects beyond front surface 22 of a first profiled part 2 only by a length 30. In this connection it is particularly important that the bolt, and thus the weld-area, be at a large lateral distance from outer walls 18 and 19 the profiled parts such that, during welding, the fluid material cannot approach the area of the front surfaces and thus interfere with the orderly connection of the profiled parts.

In order to produce the joint, profiled parts 2,3 are connected to the electrodes of a source of welding current. After the current has been switched on, the profiled parts 2,3 are moved towards each other, bringing the end-surface 34 of the bolt 20 into the immediate vicinity of the end 26 of the web 12 with the legs of screw-channel 7. During this butt- or flash butt-welding operation, the profiled parts 2,3 are pressed together with a predetermined force, causing end-surface 34 to bear against the legs on threaded channel 7. Welding occurs as a result of the arc formed and of the current flowing between bolt 20 and web 13 of the profiled part 3 and the heat arising therefrom. It is critical in this connection that, because of the above-mentioned length 30, welding takes place only between bolt 20 of the profiled part 2 and web 13 and screw-channel 7 of profiled part 3. The front surfaces 22,23 are not welded together.

It is desirable for the source of welding current to be switched off before front surfaces 22,23 come so close together that a current could flow through them. It has been found desirable to switch the current off when front surfaces 22,23 are between 2 and 0.5, preferably about 1 mm, apart. Shrinkage occurs as the weld-area cools, causing the front surfaces to bear closely and directly one against the other.

FIG. 3 shows a cross-section through the finished connection arrangement. An annular weld-bead 36, surrounding the bolt 20, can now be seen. The front surfaces 22,23 of the profiled parts 2,3 bear closely together, with no gap therebetween. The annular weld-bead 36 is spaced from front surfaces 22,23 of outer walls 18,19, especially since the bolt 20 projects beyond the front surface 22 not only by a length 30 but by a length 24. This ensures that during welding, no weld-beads, splatters, fluid or plastic material reach the front surfaces 22,23, which would prevent the surfaces from lying close together. The length 30, and the difference between length 24 and depth 28, are predetermined, so that a satisfactory butt-welded joint is obtained. Consideration must also be given to the cross-sectional area of the bolt 20. A cross-sectional area of between 50 and 100 square millimetres has been found satisfactory in practice. If the profiled parts 2,3, the webs 12,13 and/or the legs 8,10 have a wall-thickness of 2 mm, the length 24 will preferably be of the order of 17 mm and depth 28 will be approximately 10 mm. The length 30 will therefore be of the order of 7 mm and a reliable welded joint will be obtained.

So that welding shall take place exclusively between the end-surface 34 and the web 13, the bolt 20 is at an adequate distance 37 from the inner wall 15 of the profiled part 3. The weld-bead 36 is also at a minimal distance 38 from the inner wall 15. This prevents unacceptable welding and/or heating in the area of inner wall 15 of profiled part 3. It also ensures that metal heated during welding can expand unimpeded at right angles to longitudinal axis 43 and that unacceptable heating of the inner wall and the profiled part is prevented.

FIG. 4 shows an alternative embodiment requiring no additional bolt. As indicated by the broken lines, the profiled part 2 originally has a front surface 40, but it is shortened, leaving, of the web 12, only the legs 8,10 of the screw-channel 6 in the manner shown. The legs 8,10 project beyond the existing front surface 22 by length 24. The connecting element thus consists of the remaining part of the web 12 and is integral with the profiled part 2. The remaining area of the web 12 has only a circular cross-sectional area open on one side which is greater than the part of the web which is removed. The remaining part, i.e. quasi the part forming the threaded channel, is spaced accordingly upon being introduced into the hollow chamber in the other profiled part. An annular weld-bead can therefore form during welding and thus surround annularly the remaining part of the web or the connecting element in general. The part lying closest to the original inner wall 14 is also preferably removed from web 12, in order to permit a proper welded joint between end-surface 34 and the screw-channel of the other profiled part, with no current flowing in, and no heating of, the inner wall of the other profiled part.

FIG. 5 shows an example of embodiment in which longitudinal axes 42,43 of the profiled parts 2,3 do not run parallel with but at an angle to each other. In this case, the connecting element 20 is in the form of a bent bolt, but the previously mentioned lengths, depths and edge-conditions are retained. During welding, relative movement takes place in the direction of the longitudinal axis 43 of the profiled part 3. During welding, the profiled part 3, and a bent part 44 of the bolt 20, are pressed together, in the direction of longitudinal axis 43, with a predetermined force. To this end, the profiled part 2 may be held in a suitable clamping device while the profiled part 3 is moved, in the direction of longitudinal axis 43, by suitable guide-means, towards the bent part 44 of bolt 20.

FIG. 6 shows, to an enlarged scale, a bolt 20 before it is screwed into the screw-channel in a profiled part. The bolt carries a self-tapping external thread 46 and has a square or hexagonal head 48. Thus a wrench, or some other suitable tool, may be applied to this head in order to screw the bolt into the screw-channel in the profiled part. Located between the part of the bolt 20 which carries external thread 46 and the head 48 is an annular groove 50 acting as a predetermined breaking point. The dimensions of the annular groove 50 are such that the bolt can be screwed reliably into the channel provided therefor. As soon as the bolt has been screwed to the required depth, the head 48 is snapped off, breaking at the annular groove 50. It will be seen that, after the head has been snapped off, the above-mentioned end-surface of the bolt will be located in the vicinity of annular groove 50.

Although the invention was described hereinabove with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A connection arrangement for profiled parts, comprising: at least one web arranged in a first hollow chamber in a first profiled part, and a connecting element connected, wherein:
   said connecting element is connected to said web of said first profiled part and is at a distance from a front surface of said first profiled part,
   a second hollow chamber in said second profiled part is provided with a further web, said connecting element being connected in said second hollow chamber by a weld-zone to said further web,
   said second profile having a front surface adjacent said front surface of said first profile part,
   said weld-zone is arranged in said second hollow chamber of said second profiled part at a predetermined distance from said adjacent front surfaces of said first and second profiled parts,
   said weld-zone is at a distance from an outer wall of said second profile part.

2. A connection arrangement according to claim 1, wherein said connecting element projects, prior to welding, at least by a predetermined length, beyond said front surface of said first profiled part, called first front surface, and after welding, into said second hollow chamber in said second profiled part, said predetermined length being greater than said predetermined distance between said weld-zone and said adjacent front surfaces of the profiled parts.

3. A connection arrangement according to claim 1, wherein prior to welding, said connecting element projects, by a predetermined length, beyond said front surface of said first profiled part, called first front surface, and wherein an end of said further web is set back, to a depth from said front surface of said second profiled part, called second front surface, said predetermined length being greater than said depth.

4. A connection arrangement according to claim 1, wherein welded joint is present exclusively in said weld-zone in the interior of said second hollow chamber, a current being shut off during welding while said front surfaces are still at a predetermined short distance from each other.

5. A connection arrangement according to claim 1 wherein said web, or said connecting element of said first profiled part, is spaced from an inner wall of said second profiled part perpendicularly to the longitudinal axis of said second profiled part.

6. A connection arrangement according to claim 1, wherein said connecting element is in the form of a bolt which is screwed into a screw-channel in said web of said first profiled part.

7. A connection arrangement according to claim 1, wherein a weld bead in said weld-zone in said second hollow chamber is made by pressing said connecting element, which is a bolt, of said first profiled part to said further web of said second profiled part during welding.

8. A connection arrangement according to claim 1, wherein said web in said first hollow chamber comprises an area having an expanded cross-section in the form of legs of a threaded passage, and wherein said web with this expanded area projects into said second hollow chamber of said second profiled part and is welded to a similarly expanded area of said web in said second hollow chamber, in the form of legs of a screw-channel.

9. A connection arrangement according to claim 1, wherein said connecting element is firmly connected to said web of said first profiled part and wherein said weld-zone is arranged in said second hollow chamber of said second profiled part spaced a predetermined distance from adjacent end faces of said first and second profiled parts in the direction of a longitudinal axis of said second profiled part.

10. A connection arrangement according to claim 1, wherein said connecting element is a bolt connected inside said second profiled part to said further web and wherein in the welded position, said two front surfaces of said two profiled parts bear closely against each other but are fill of any welding.

11. A connection arrangement according to claim 10, wherein said weld-zone is in the form of an annular weld-bead.

12. A connection arrangement according to claim 1, wherein said first and second profiled parts have longitudinal axes which are not parallel but are at an angle to each other, and wherein said connecting element is in the form of a bent bolt and during welding a bent part of said bolt and said second profiled part are pressed together in the direction of said longitudinal axis of said second profiled part, with a predetermined force.

13. A connection arrangement according to claim 1, wherein said first and second profiled parts have enlarged connecting areas in said hollow chambers, said connecting areas being connected to inner walls of said first and second profiled parts only by webs which extend from inner walls of said first and second profiled parts.

14. A connection arrangement according to claim 13, wherein said connecting element is in the form of a bolt; prior to welding said bolt is provided with a head engageable by a tool to screw said bolt into said enlarged connecting area of said first profiled part, and said head can be snapped off after screwing said bolt into said enlarged connecting area of said first profiled part.

15. A connection arrangement for profiled parts comprising at least one web arranged in a first hollow chamber in a first profiled part having an end face and an outer wall, and a connecting element by means of which a second profiled part and said web are connected, wherein
   said connecting element is connected to said web of said first profiled part and si spaced a distance from an end face of said first profiled part, pl a second hollow chamber in said second profiled part is provided with a further web, said connecting element being connected in said second hollow chamber by a weld-zone to said further web,
   said second profile part having an end face adjacent said end face of said first profile part,
   said weld-zone is arranged in said second hollow chamber of said second profile part spaced a predetermined distance from said adjacent end faces of said first and second profiled parts, and
said connecting element is made in one piece with said web of said first profiled part and is made by removing a predetermined length of a part of said outer wall of said first profiled part.

16. A combination arrangement for profiled parts comprising: at least one web arranged in a first hollow chamber in a first profiled part, and a connecting element by means of which a second profiled part and the web are connected, wherein said connecting element is connected to said web of said first profiled part and is spaced a distance from a front surface of said first profiled part, a second hollow chamber in said second profiled part is provided with a further web, said connecting element being connected in said second hollow chamber by a weld-zone to said further web said second profile part having a front surface adjacent said front surface of said first profile part, said weld-zone is arranged in said second hollow chamber of said second profiled part spaced a predetermined distance from said adjacent front surfaces of said first and second profiled parts, and said connecting element is formed by said web of said first profiled part, said first profiled part being shortened to leave said web projecting to a predetermined distance beyond said front surfaces of said first profiled part.

17. A connection arrangement for profiled parts, comprising at least one web arranged in a first hollow chamber in a first profiled part, and a connecting element by means of which is a second profiled part and said web are connected, wherein said first web projects from an inner wall of said first profiled part and ends in an enlarged connecting area and said connecting element is arranged to project a predetermined distance beyond an end face of said first profiled part, a second hollow chamber in said second profiled part is provided with a further web projecting from an inner wall of said second profiled part and ending in an enlarged connecting area to which said connecting element is connected by a weld zone, and said weld-zone is arranged between axial end faces of said connecting element and said enlarged connecting area of said second profiled part and is spaced from said inner walls of said first and second profiled parts.

18. A connection arrangement according to claim 17, wherein prior to welding said connecting element is connected solely to said enlarged connecting area of said first profiled part, said enlarged connecting area of said second profiled part is shortened providing a predetermined spacing between the axial end face of said enlarged connecting area of said second profiled part and an end face of said second profiled part, and after welding said weld-zone is exclusively between said axial end faces of said shortened connecting area of said second profiled part and said connecting element, and adjacent end faces of outer walls of said first and second profiled parts lie tightly against each other and are free of any welding.

19. A connection arrangement according to claim 18, wherein prior to welding said connecting element projects a predetermined length beyond said end face of said first profiled part, and said end face of said first profiled part and an end face of said second profiled part are spaced a predetermined distance from each other when a welding current used to weld said connecting element to said enlarged connecting area of said second profiled part is shut off, whereby said end faces of said connecting element and said enlarged connecting area are drawn into contact with each other by contraction of said connecting element as it cools after welding.

* * * * *